United States Patent [19]

Hadden

[11] 3,742,473

[45] June 26, 1973

[54] PULSE DISCRIMINATOR AND TELEMETERING SYSTEMS USING SAME

[76] Inventor: David M. Hadden, 700 Saratoga Avenue, San Jose, Calif.

[22] Filed: Aug. 12, 1970

[21] Appl. No.: 63,178

[52] U.S. Cl. .................. 340/210, 340/203, 340/206, 307/234, 307/235

[51] Int. Cl. .................. G08c 19/16

[58] Field of Search .................. 340/203; 307/234, 307/235, 246; 328/109, 115, 111; 329/109, 106

[56] References Cited

UNITED STATES PATENTS

| | | | |
|---|---|---|---|
| 3,525,089 | 8/1970 | Bruce | 340/206 |
| 3,387,221 | 6/1968 | Arberman et al. | 307/234 |
| 3,553,605 | 1/1971 | Brock et al. | 329/107 |
| 3,260,962 | 7/1966 | Draper et al. | 307/246 |
| 3,517,556 | 6/1970 | Barker | 73/362 |

FOREIGN PATENTS OR APPLICATIONS

| | | | |
|---|---|---|---|
| 279,136 | 9/1965 | Australia | 307/232 |
| 263,250 | 3/1964 | Australia | 307/234 |

*Primary Examiner*—John W. Caldwell
*Assistant Examiner*—Robert J. Mooney
*Attorney*—Harry E. Aine and William J. Nolan

[57] ABSTRACT

A telemetering system is disclosed having a transmitter located at an outlying station for generating a train of pulses having a certain parameter which is a function of a quantity to be measured. The pulses are transmitted over a two wire transmission line to a receiver located at a base station. The receiver includes a pulse discriminator for discriminating both the minimum height and the minimum pulse width of the pulses to be metered by the receiver. The pulse discriminator includes a pulse generator, such as a unijunction transistor, having a storage capacitor connected across its input terminals. The capacitor is charged up through a resistor such that the time to reach the triggerable level for the pulse generator is equal to the minimum pulse width to be discriminated. The charging cycle for the capacitor is controlled through a switching transistor biased such that input pulse to be discriminated must have a certain pulse height to cause the transistor to switch current to the capacitor and the switching transistor is held "on" only so long as the pulse height exceeds the minimum level. The capacitor charging cycle is reset each time the input pulse falls below the predetermined pulse height reference level.

17 Claims, 3 Drawing Figures

Patented June 26, 1973 3,742,473

INVENTOR
DAVID M. HADDEN

BY *Harry E. Aine*

ATTORNEY

PULSE DISCRIMINATOR AND TELEMETERING SYSTEMS USING SAME

DESCRIPTION OF THE PRIOR ART

Heretofore, pulse telemetering systems have been proposed wherein a transmitter, at an outlying station, transmitted a train of radio frequency pulses over a coaxial cable to a receiver, at a base station. A bandpass filter was provided at the input to the receiver for passing only those RF pulses falling within a certain passband, thus, excluding certain noise. Such a telemetering system is disclosed in U.S. Pat. No. 3,231,877 issued Jan. 25, 1966. The problem with this type of a telemetering system is that the coaxial cable is relatively expensive. Thus, if the coaxial cable has to be relatively long to reach the end of a mine shaft or a remote station in a refinery or the like, the cost of the coaxial cable can constitute one of the major costs in the costs of the telemetering system. In addition, the band-pass filter discriminates only against pulses having frequencies other than the frequencies within the bandpass and does not disciminate against low pulse height noise as opposed to desired relatively high pulse height signals.

Thus, there is a need for a relatively low-cost pulse telemetering system which may utilize relatively inexpensive two conductor transmission line connecting the base station with the outlying station and over which the transmitted signals may pass to the receiver with means in the receiver for discriminating against undesired noise.

SUMMARY OF THE PRESENT INVENTION

The principal object of the present invention is the provision of an improved pulse discriminator and telemetering systems using same.

One feature of the present invention is the provision in a telemetering system having an outlying pulse transmitter connected to a receiver, at the base station, via the intermediary of an unshielded two conductor transmission line of a pulse discriminator in the input to the receiver which discriminates pulses for a minimum pulse width and a minimum amplitude, whereby noise is effectively suppressed in the metered output of the receiver.

Another feature of the present invention is the same as the preceding feature wherein a power supply is provided at the base station for energizing the transmission line with dc current and voltage and wherein the transmitter at the outlying station pulse modulates the dc voltage on the transmission line for producing a train of output pulses traveling over the transmission line from the transmitter to the receiver.

Another feature of the present invention is the provision of an improved pulse discriminator means for discriminating both the minimum pulse height and minimum pulse width of input pulses to be discriminated and which includes a triggerable pulse generator having a capacitor connected across the input terminals thereof, such capacitor being charged from a source through a charging resistor to a voltage level which will trigger the triggerable pulse generator, the charging time for the capacitor being determinative of the minimum pulse width to be discriminated, and including switching means responsive to the receipt of the leading edge of an input pulse to be discriminated for switching the charging current into the storage capacitor and for maintaining the flow of charging current to the capacitor only so long as the input pulse to be discriminated does not fall below a predetermined pulse height which is determinative of the minimum pulse height to be discriminated.

Another feature of the present invention is the same as the preceding feature wherein the triggerable pulse generator comprises a unijunction transistor having a pair of base electrodes and a gate electrode with the storage capacitor being connected across one of the base electrodes and the gate electrode.

Another feature of the present invention is the same as the preceding feature wherein the switching means for switching the charging current to the storage capacitor and for maintaining the flow of charging current thereto comprises a transistor the base to emitter junction of which is biased at a certain voltage level which is a function of the minimum pulse height to be discriminated and wherein the emitter and collector electrodes are connected in shunt with the storage capacitor for switching the charging current into the storage capacitor so long as the pulse height is above the bias level and for discharging the storage capacitor when the pulse to be discriminated has a pulse height falling below the predetermined bias reference level.

Other features and advantages of the present invention will become apparent upon a perusal of the following specification taken in connection with the accompanying drawings wherein:

DESCRIPTION OF THE PREFERRED EMBODIMENTS

Figure 1:
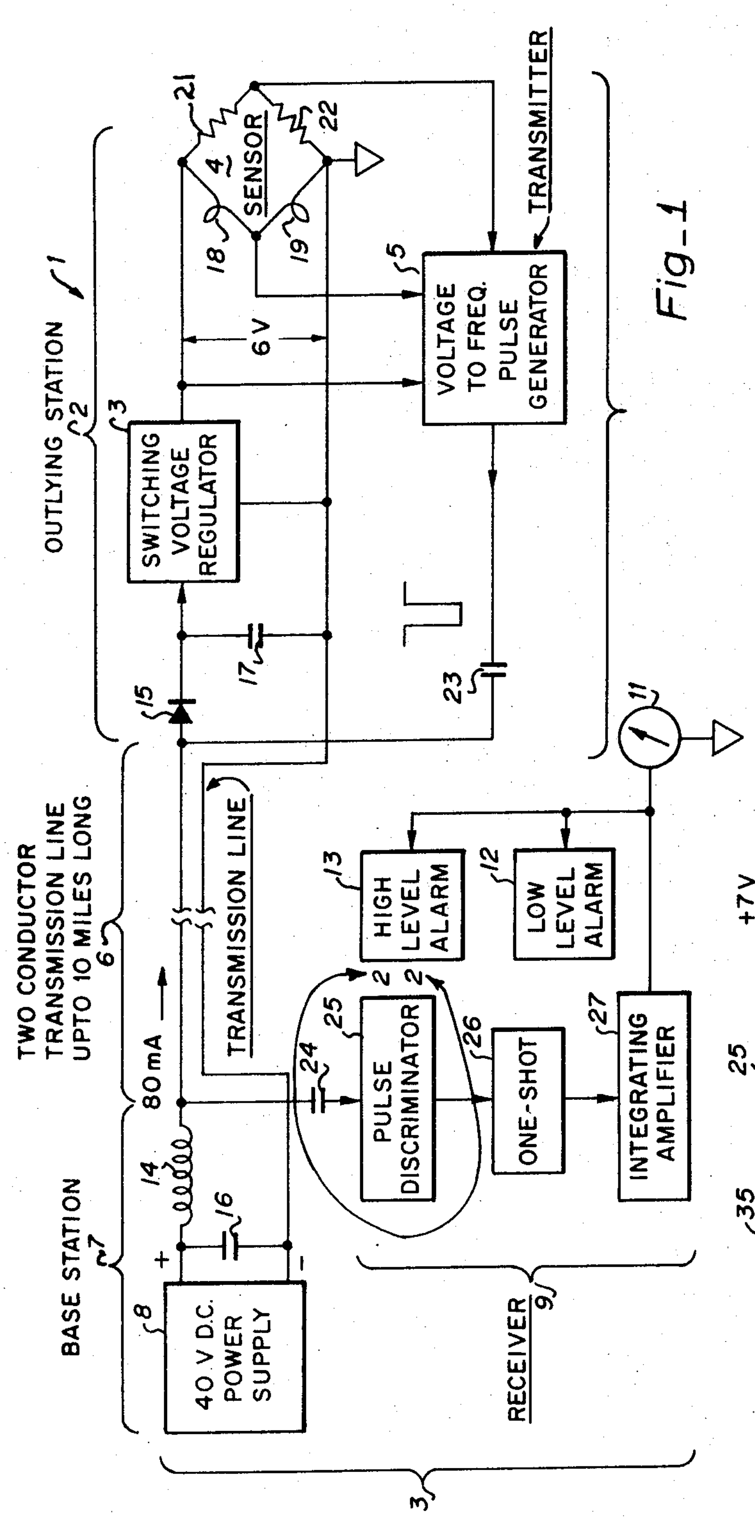
FIG. 1 is a schematic line diagram, partly in block diagram form, depicting a telemetering system incorporating features of the present invention.

Referring now to FIG. 1, there is shown a telemetering system 1 incorporating features of the present invention. The telemetering system 1 includes a portion 2 disposed at an outlying station, such as at the end of a mine shaft, or at a remote pumping station or the like in a refinery. The outlying station portion 2 includes a switching voltage regulator 2 for receiving power and converting the received power to a well regulated lower voltage output applied across the terminals of a sensor 4, such as a bridge which senses some quantity to the measured, such as the presence of a combustible gas, to produce an output which is applied to a voltage-to-frequency pulse generator 5. Pulse generator 5 forms a transmitter for transmitting the sensed quantity via a train of dc pulses over a two conductor transmission line 6, which may be up to 10 miles long, to a base station 7. The base station 7 includes a source of dc power 8 for energizing the switching voltage regulator 3, sensor 4 and transmitter 5 via power supplied over the two conductor transmission line 6. The base station 7 also includes a receiver 9 which receives the train of dc pulses and coverts the train of pulses to a metered output which drives a meter 11 and a pair of alarms, such as a low level alarm 12 and a high level alarm 13.

In a typical example, the power supply 8 supplies approximately 80 milliamps of current at 40 volts through RF choke 14 and the two conductor transmission line 6 to the input of the switching voltage regulator 3 via the intermediary of a rectifier, such as diode 15. A smoothing capacitor 16 is connected across the output terminals of the power supply and a storage capacitor 17, as of 10 microfarads at 40 volts, is connected across the input to the switching voltage regulator 3 for maintaining the voltage to the regulator in the presence of the output pulses applied to the transmission line 6. The output of the switching voltage regulator 3 is an output voltage of 6 volts applied to energize the sensing bridge network 4.

The sensing bridge 4 includes a pair of catalytic combustible gas detecting filaments 18 and 19 connected in opposite arms of the bridge and a pair of reference resistors 21 and 22 connected in the other arms of the bridge. One of the filaments 19 forms a reference and other filament 18 is an active filament which experiences a change of resistance which is a function of the combustible gas content in the atmosphere exposed to the sensor 4. When the combustible gas is sensed by the sensing filament 18, the bridge is unbalanced and the unbalance voltage is fed to the input of the voltage-to-frequency pulse generator 5, which is supplied with a reference voltage and power from the output of the switching voltage regulator 3.

The output of the voltage-to-frequency pulse generator 5 is a train of negative dc pulses, as of 20 to 30 microseconds in pulse width of a pulse height as of 5 volts. The pulse repetition rate is determined by the unbalance of the bridge 4 and, in a typical example, the pulse repetition rate varies from 500 pulses per second to 2,000 pulses per second over the range of combustible gas concentrations to be measured by the sensor 4. The output pulses of the voltage-to-frequency pulse generator 5 are coupled via a coupling capacitor 23 onto the positive conductor of the two conductor transmission line 6 for periodically reducing the voltage on the transmission line in accordance with the output negative dc pulses supplied from the transmitter 5.

The train of transmitted negative pulses superimposed on the positive dc line voltage travel down the two conductor transmission line from the outlying station 2 to the base station 7. At the base station 7, the RF choke 14 as of 5 millihenries decouples the pulses and they are coupled off the line at this point to the input of receiver 9 via a second coupling capacitor 24.

The receiver 9 includes a pulse discriminator 25, to be more fully described below with regard to FIG. 2, which discriminates both the minimum pulse width and the minimum pulse height for the pulses to be metered by the receiver 9, whereby undesired noise is excluded in the metered output of the receiver 9. More specifically, it has been found that noise coupled onto an unshielded two conductor transmission line in a typical heavy industrial application, such as in a mine or in a refinery, is typically characterized as transient RF noise associated with starting up or shutting down relatively large pieces of electrical equipment, such as motors, generators, telephone lines, or the like. The two conductor transmission line 6 is preferably as inexpensive as possible. This means it may comprise lamp cord wire, doorbell wire, a wire strung alongside a grounded conductive pipe, electrical metal conduit, metal track, metal rail or the like. Or it may comprise a wire strung inside an electrical conduit as the other conductor.

It has been found that when two unshielded conductors are laid out in such a heavy industrial environment, the transmission line thus formed has a relatively low distributed capacitance such that its resonance ringing frequency is relatively high having a half period shorter than 5 microseconds. Thus, the noise typically associated with such transmission line is of a transient nature which causes a ringing of the transmission line, such noise having a half period less than 5 microseconds. Moreover, it is found that the noise can have extremely high amplitude and generally decays expotentially.

Accordingly, the pulse discriminator 25 is designed such that it will discriminate against input pulses which do not have a pulse width in excess of 5 microseconds during which the pulse height does not fall below a predetermined amplitude, as of 1 volt, etc. In this manner, the noise typically associated with such a two conductor transmission system is eliminated at the input to the receiver 9. The pulse discriminator 25 is described in greater detail below with regard to FIGS. 2 and 3.

The output of the pulse discriminator 25 is one or more output pulses corresponding to each of the desired input pulses for triggering a one-shot multivibrator 26 to produce an output pulse of relatively long duration, as of 100 microseconds, and of a standard amplitude, as of 6 volts. After each output pulse the one-shot multivibrator 26 resets itself and stands ready to receive the next input pulse. The output of the one-shot multivibrator 26 is fed to the input of an intergrating amplifier 27 which serves to integrate and amplify the pulse outputs of the one-shot multivibrator 26 to produce a metered output dc signal having an amplitude which is a function of the pulse repetition rate of the pulse train transmitted from transmitter 5. Thus the metered output is proportional to the quantity being sensed by the sensor 4 at the outlying station 2. The metered output from integrating amplifier 27 is fed to meter 11 to produce an indication to the operator of the concentration of gas or other quantity being measured by the sensor 4. A sample of the output from integrating amplifier 27 is also fed to the input of the low level alarm 12 and high level alarm 13.

The low and high level alarms 12 and 13 each include a Schmitt trigger set to be triggered by a given input voltage amplitude corresponding to some predetermined level of the quantity being measured by the sensor 4.

The low level alarm 12 is typically set to some low level, as of 20 percent of the lower explosive limit of the concentration of the combustible gas in air, whereas the high level alarm is typically set for some higher value, as of 40 percent of the lower explosive limit. Thus, when the output of the integrating amplifier 27 reaches the low level alarm value, the low level alarm 12 is triggered to warn the operator that the low level has been reached. When the metered output of integrating amplifier 27 reaches a level corresponding to the trigger value of the high level alarm B, the high level alarm 13 is triggered to either shut down the mine, pumping station or the like and/or to sound a second alarm.

One of the advantages of the pulse discriminator 25 is that it has a pulse height sensing level which requires the pulse height to remain at that level for the duration of the minimum pulse width. Since the typical noise on such a transmission line has a half period less than the minimum pulse width discrimination provided by the discriminator 25, such noise may, when super-imposed upon a pulse to be measured, cause the pulse height of the signal pulse to be reduced below the minimum level, thus preventing a measurement of the signal pulse that coincides with the noise. This produces only a missed pulse indication and causes the metered output of the integrating amplifier 27 to drop slightly instead of being increased as may otherwise be obtained if such noise were to be measured. Thus, such transient noise does not trigger either the low or high level alarm and produces only a minor negative deflection of the output meter 11. This is greatly preferred to a system which would permit the noise to be measured and thus would result in producing a positive deflection of the meter which could cause the low and high level alarms to be triggered.

Figure 3:
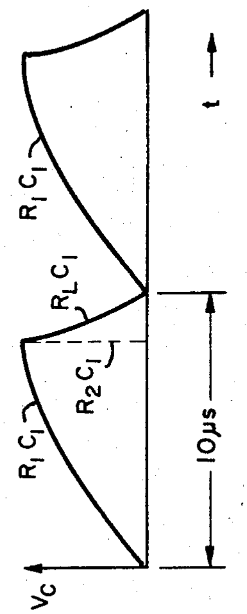
FIG. 3 is a plot of voltage versus time depicting the build-up and discharge of voltage across capacitor $C_1$ in the circuit of FIG. 2.
Figure 2:
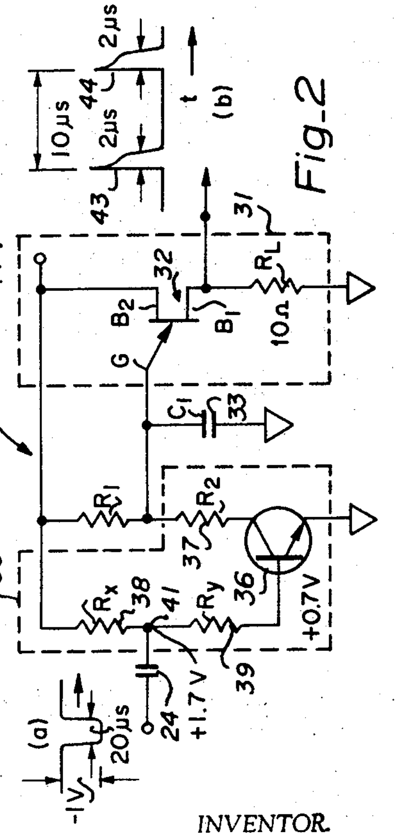
FIG. 2 is a schematic circuit diagram for the pulse discriminator portion of the circuit of FIG. 1 delineated by line 2—2.

Referring now to FIGS. 2 and 3, the pulse discriminator 25 of the present invention will be described in greater detail. The pulse discriminator 25 includes a triggerable pulse generator indicated by phantom lines at 31 and formed by a unijunction transistor 32 having a first base electrode $B_1$, a second base electrode $B_2$ and a gate electrode G. A source of potential, as of 7 volts, is applied across the base electrodes $B_1$ and $B_2$ through the intermediary of a load resistor $R_L$, as of 10 ohms. The output pulses are extracted across the load resistor $R_L$. A storage capacitor 33, of capacitance $C_1$, is connected to the input of the triggerable pulse generator 31 across the gate electrode and ground through the first base electrode $B_1$ of the load resistor $R_L$. The storage capacitor 33 is charged from the 7 volt source through a charging resistor 34, of resistance $R_1$.

A switching circuit, indicated by phantom lines at 35 controls the charging and the discharging cycle of the storage capacitor 33. More particularly, the switching circuit 35 includes a switching transistor 36 having its collector and emitter electrodes connected cross the storage capacitor 33 via the intermediary of a relatively small load resistor 37 of resistance $R_2$. The base electrode of transistor 36 is connected to the source of positive potential via the intermediary of a voltage divider consisting of resistors 38 and 39 with a node 41 connection therebetween.

Resistors 38 and 39, of resistance $R_x$ and $R_y$, respectively, are proportioned such that the voltage at node 41, assuming approximately 0.7 volts is dropped across the base to emitter junction of the transistor is at a certain positive threshold potential as of 1.7 volts. In this manner an input pulse, as shown by waveform (a), must have a certain negative pulse height, as of $-1\nu$, in order to turn transistor 36 off. Thus, the ratios of resistance $R_x$ to $R_y$ determine the negative threshold pulse height potential for a pulse applied at the input to the pulse discriminator 25 to produce an output.

Upon receipt of a pulse to be discriminated, if the pulse height exceeds the predetermined threshold value, transistor 36 is turned off, thus switching the charging current through charging resistor 34 into the storage capacitor 33. The values of resistance $R_1$ and capacitance $C_1$ are chosen such that the voltage builds up on storage capacitor 33 in an exponential fashion to the threshold trigger voltage level for triggering pulse generator 31 in a time corresponding to the minimum pulse width to be discriminated, as of 10 microseconds (see FIG. 3). If the input pulse has sufficient negative amplitude during the 10 microseconds, an output pulse of approximately 2 microseconds duration and approximately 1.7 volts amplitude will be produced at the output of the triggerable pulse generator 31, as shown by pulse 43 of waveform (b). This pulse is of sufficient amplitude to trigger the one-shot multivibrator 26.

When the unijunction transistor 32 is triggered to produce output pulse 43, the charge on capacitor $C_1$ is discharged through the gate electrode G, first base electrode $B_1$ of the unijunction transistor 32, and through the load resistor $R_L$. The discharge time constant of $C_1$ and $R_L$ is on the order of 2 microseconds. The charging cycle then repeats so long as the input pulse is still present causing the voltage again to buildup across storage capacitor 33 and to reach the trigger level and a second output pulse 44 is obtained from the output of the triggered pulse generator 31. A second pulse 44 is not necessary to fire the one-shot multivibrator as the one shot has been fired previously by the first pulse 43 and the one-shot has a pulse width of 100 microseconds such that a second pulse is not necessary.

On the termination of the input pulse, the negative voltage disappears at the input to the switching transistor 36 and the transistor is switched to a conducting state. Upon switching to the conducting state, the charge stored on the storage capacitor 33 is discharged through resistor 37 and through the collector and emitter electrode of the switching transistor 36 to ground. The discharge time constant $R_2 C_1$ is very short, on the order of a few nanoseconds.

If noise were to be superimposed upon the input pulse shown by waveform (a), such noise having sufficient amplitude to reduce the negative pulse height below the required threshold amplitude for triggering the switching transistor 36, transistor 36 would be switched on, thus discharging capacitor 33. Unless the pulse height of the input pulse has a negative pulse height greater than −1 volt for longer than 5 microseconds no output pulse will be obtained from the output of the pulse discriminator 25. The advantage of the pulse discriminator 25 is that it is a relatively simple circuit requiring only two transistors, a storage capacitor and a few resistors. Such a circuit is extremely useful in the telemetering system 1 of FIG. 1 in that it effectively eliminates the kind of noise, from the input of the receiver, typically encountered in heavy industrial applications and is much preferred to the conventional bandpass filter as heretofore employed in telemetering systems.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

RELATED CASES

A telemetering system employing a two conductor transmission line for supplying power to a remote station while permitting a train of telemetering dc pulses to be transmitted back over the same two conductors to a receiver is disclosed and claimed in copending U.S. Pat. application, Ser. No. 63,155 filed Aug. 12, 1970 and assigned to the same assignee as the present invention.

What is claimed is:

1. In a telemetering system, transmitter means to be located at an outlying station for generating a train of pulses, said pulses having a predetermined fixed width and being of a repetition rate which is a function of a quantiy to be metered, receiver means to be located proximate a base station for receiving the transmitted train of pulses and being responsive to the repetition rate of said pulses for producing a metering output which is a measure of the quantity to be metered, two conductor transmission line means for interconnecting the base station and the outlying station and over which the train of transmitted pulses is to be transmitted from said transmitter means to said receiver means, the improvement wherein, said receiver means includes a pulse discriminator means for discriminating the pulses to be metered by said receiver means as received over said transmission line means from said transmitter means and for converting only such discriminated pulses into an output which have an amplitude in excess of a predetermined threshold value for a predetermined minimum threshold time, whereby noise is effectively suppressed in the metering output of said receiver means.

2. In a telemetering system, transmitter means to be located at an outlying station for generating a train of pulses having a certain parameter which is a function of a quantity to be metered, receiver means to be located proximate a base station for receiving the transmitted train of pulses and being responsive to the certain parameter thereof for producing a metering output which is a measure of the quantity to be metered, two conductor transmission line means for interconnecting the base station and the outlying station and over which the train of transmitted pulses is to be transmitted from said transmitter means to said receiver means, the improvement wherein, said receiver means includes a pulse discriminator means for discriminating the minimum height and minimum width of the pulses to be metered by said receiver means as received over said transmission line means from said transmitter means, and for converting only such discriminated pulses into an output which meet both the minimum requirements of pulse width and height, whereby noise is effectively suppressed in the metering output of said receiver means, and wherein said pulse discriminator means includes, a storage capacitor and a resistor through which said capacitor is to be charged, means for charging said capacitor from a source of current through said resistor, a triggerable pulse generator means for generating an output pulse when an input trigger signal to said triggerable pulse generator exceeds a reference amplitude, said storage capacitor being connected across the input to said triggerable pulse generator for building-up an input trigger signal voltage to said pulse generator in accordance with the charge on said capacitor, said resistor and capacitor having values to provide a time constant such that the time to charge the said capacitor to the voltage level thereacross which will trigger said pulse generator means is determinative of the minimum pulse width to be discriminated, switching means responsive to the pulse height of the input pulse to be discriminated for switching to a first state to feed the charging current into said storage capacitor through said resistor and for maintaining the flow of charging current to said capacitor only so long as the pulse height of the input pulse to be discriminated does not fall below a predetermined threshold amplitude, said switching means also being arranged so that when the input pulse does fall below the predetermined amplitude said switching means switches to a second state to rapidly discharge the charge stored on said capacitor, and means for setting said certain predetermined pulse height threshold amplitude of said switching means.

3. The apparatus of claim 2 wherein said switching means comprises a single transistor having base, emitter and collector electrodes, said capacitor being connected across said emitter and collector electrodes, and means for applying pulses to be discriminated across the base and emitter electrodes of said transistor.

4. The apparatus of claim 2 wherein said triggerable pulse generator means comprises a unijunction transistor having a pair of base electrodes and a gate electrode, said capacitor being connected across one of said base electrodes and said gate electrode.

5. The apparatus of claim 3 including a source of potential applied across said collector and said emitter electrodes of said transistor, a voltage divider means having first and second resistive means with a node therebetween connected in series between the source of potential and said base electrode of said transistor, and means for coupling the pulses to be discriminated between said node of said voltage divider and said emitter electrode of said transistor, said voltage divider serving to establish the minimum pulse height for pulses to be discriminated by said pulse discriminator means.

6. The apparatus of claim 1 wherein said two conductor transmission line means comprises an unshielded pair of conductors.

7. The apparatus of claim 1 wherein said two conductor transmission line means comprises a pair of unshielded wires.

8. The apparatus of claim 1 wherein said two conductor transmission line means comprises a single wire strung through an electrical conduit which forms the second conductor of said transmission line.

9. The apparatus of claim 1 wherein said two conductor transmission line comprises a wire and a spaced hollow conductive pipe.

10. The apparatus of claim 1, including, power supply means to be connected to said transmission line means at the base station for energizing said pair of conductors with dc current and voltage, and wherein said transmitter means includes, means for pulse modulating the dc voltage on said transmission line at the outlying station for producing the train of output pulses traveling over said transmission line from said transmitter means to said receiver means.

11. The apparatus of claim 1 wherein said transmitter means produces a train of pulses of reduced potential on said transmission line.

12. In a method for telemetering, generating a train of pulses at an outlying station, said pulses having a certain predetermined fixed pulse width and being of a repetition rate which is a function of a quantity to be measured, transmitting the train of pulses over a two conductor transmission line to a base station, receiving the transmitted train of pulses at the base station, producing a metered output from the received pulses which is a measure of the quantity to be metered at the outlying station, discriminating the pulses as received over the transmission line from the outlying station for a minimum pulse height and a minimum pulse width such that only such pulses having an amplitude in excess of a predetermined threshold value for a predetermined minimum threshold time are metered, whereby noise is effectively suppressed in the telemetering of the signals from the outlying station to the base station.

13. The method of claim 12 wherein the step of discriminating the pulses as received over the unshielded transmission line includes the step of discriminating against the pulses which are not wider than a few microseconds.

14. In a pulse discriminator apparatus, storage capacitor means and a resistor means through which said storage capacitor is to be charged, means for charging said storage capacitor from a source of current through said resistor, triggerable pulse generator means for generating an output pulse when an input trigger signal to said triggerable pulse generator exceeds a reference amplitude said storage capacitor being connected across the input to said triggerable pulse generator for building-up an input trigger signal voltage to said pulse generator in accordance with the charge on said capacitor, said charging resistor and storage capacitor having a time constant such that the time to charge the said capacitor to the voltage level thereacross which will trigger said triggerable pulse generator means is determinative of the minimum pulse width to be discriminated, switching means responsive to a certain predetermined threshold pulse height of the input pulses to be discriminated for switching to a first state to feed the charging current through said resistor means into said storage capacitor and for maintaining the flow of charging current to said capacitor only so long as the input pulse to be discriminated does not fall below the predetermined threshold pulse height, said switching means also being arranged so that when the pulse height of the input pulse does fall below the predetermined amplitude said switching means switches to a second state for rapidly discharging the charge stored on said capacitor, and means for setting said certain predetermined threshold pulse height of said switching means.

15. The apparatus of claim 14 wherein said switching means comprises a single transistor having base, emitter and collector electrodes, said storage capacitor being connected across said emitter and collector electrodes, and means for applying pulses to be discriminated across the base and emitter electrodes of said transistor.

16. The apparatus of claim 14 wherein said triggerable pulse generator means comprises a unijunction transistor having a pair of base electrodes and a gate electrode, said storage capacitor being connected across one of said base electrodes and said gate electrode.

17. The apparatus of claim 15 including, a source of potential applied across said collector and emitter electrodes of said transistor, voltage divider means having first and second resistive means with a node therebetween connected in series between said source of potential and said base electrode of said transistor, and means for coupling the pulses to be discriminated between said node of said voltage divider and said emitter electrode of said transistor, said voltage divider serving to establish the minimum pulse height for pulses to be discriminated by said pulse discriminator means.

* * * * *